United States Patent
Boon

[15] 3,650,319
[45] Mar. 21, 1972

[54] HEAT EXCHANGE DEVICE

[72] Inventor: George B. Boon, Webster Groves, Mo.

[73] Assignee: Monsanto Company, St. Louis, Mo.

[22] Filed: Apr. 24, 1970

[21] Appl. No.: 31,467

[52] U.S. Cl. ...................................... 165/88, 165/93, 259/3
[51] Int. Cl. .......................................................... F28d 11/00
[58] Field of Search .................................. 165/87–93; 159/6

[56] References Cited

UNITED STATES PATENTS

| | | |
|---|---|---|
| 1,166,139 | 12/1915 | Marwedel .............................. 165/92 |
| 3,430,690 | 3/1969 | Sciaux .................................. 159/6 X |

FOREIGN PATENTS OR APPLICATIONS

| | | |
|---|---|---|
| 256,037 | 5/1963 | Australia ............................... 165/92 |
| 936,059 | 9/1963 | Great Britain ......................... 165/90 |

Primary Examiner—Frederick L. Matteson
Assistant Examiner—Theophil W. Streule
Attorney—John L. Young, James W. Williams, Jr. and Neal E. Willis

[57] ABSTRACT

A heat exchanger for a product fluid comprises a rotor and a shell, one of which rotates. The rotor comprises a hollow shaft and hollow disk-like members attached to and communicating with the shaft which members and shaft form a tortuous conduit for a heat transfer fluid. The hollow disk-like members are not flat but have their central openings which attach to the shaft displaced above their distal edges. Similarly shaped disk-like partitions attached to the shell by support means and interleaved with the hollow disk-like members form together with the shell, rotor shaft, and hollow disk-like members a second tortuous conduit for a product fluid which product fluid is separated from the heat transfer fluid by the heat conductive walls of the rotor shaft and hollow disk-like members. The heat exchanger is particularly useful for conducting a reaction of a high viscosity liquid under closely controlled temperature conditions and continuous agitation.

5 Claims, 17 Drawing Figures

Patented March 21, 1972   3,650,319

INVENTOR
GEORGE B. BOON
BY
AGENT

Patented March 21, 1972

INVENTOR
GEORGE B. BOON

BY

AGENT

INVENTOR
GEORGE B. BOON
BY
AGENT

HEAT EXCHANGE DEVICE

BACKGROUND OF THE INVENTION

This invention relates to an improvement in heat transfer and particularly to a device which is useful in the heating and cooling of fluids as well as maintaining the temperature of a fluid within close tolerances. More particularly it relates to a device which is useful in the heating and cooling of viscous liquids.

Although the heat exchange art is an old one, known devices and processes are not suited to many exchange problems. In the operation of many industrial processes there is a need to maintain or change the temperature of a fluid under closely controlled conditions and continuous agitation. Such a need is most apparent, particularly, where the fluid is a high viscosity liquid with a low heat transfer coefficient. This is also true where a reaction must be conducted with a high viscosity liquid having a low heat transfer coefficient under carefully controlled temperatures and a high level of agitation. This need for efficient heat transfer and a high level of agitation is not met by presently available devices. To fulfill this need, a novel approach is needed.

SUMMARY OF THE INVENTION

The heat exchanger of this invention comprises support means, drive means, structural elements comprising a shell having an opening and a removable end portion and a hollow rotor shaft insertable within the shell and, when in place within the shell, extending beyond the shell through an opening in the shell concentric to the vertical axis of the shell, and flow directing elements positioned within the shell between the rotor shaft and the shell comprising a plurality of hollow disklike members connected to the rotor shaft and a plurality of disklike partitions comprising a plurality of sections, and partition support means which connects the partitions to the shell and holds them in interleaved spaced relation to the hollow disklike members. Both the hollow disklike members and the disklike partitions have a central opening, a distal edge and a surface extending from the central opening to the distal edge. The plane of the central opening is displaced from but substantially parallel to the plane of the distal edge. When in place within the shell the plane of the central opening is above the plane of the distal edge and both planes are substantially perpendicular to the vertical axis of the shell. The hollow disklike members have a top portion, a bottom portion, a distal edge portion connecting the distal edges of the top and bottom portions and at least one substantially radial baffle for directing flow of a heat transfer fluid within the hollow member. The hollow rotor shaft has an inlet, an outlet and openings communicating with the hollow members whereby a tortuous conduit is formed within the hollow rotor shaft and the hollow members for the passage of a heat transfer fluid. The hollow members and the rotor shaft, the partitions and the shell form a second tortuous conduit for the passage of a product fluid which exchanges heat through heat conductive surfaces of the rotor shaft and hollow disklike members with the heat transfer fluid. A support means is connected to, and supports, a structural element. A drive means is connected to, and imparts rotational motion about the vertical axis of the heat exchanger to, one of the structural elements. The rotational motion agitates the product fluid while it exchanges heat with the heat transfer fluid.

DETAILED DESCRIPTION

Figure 1:
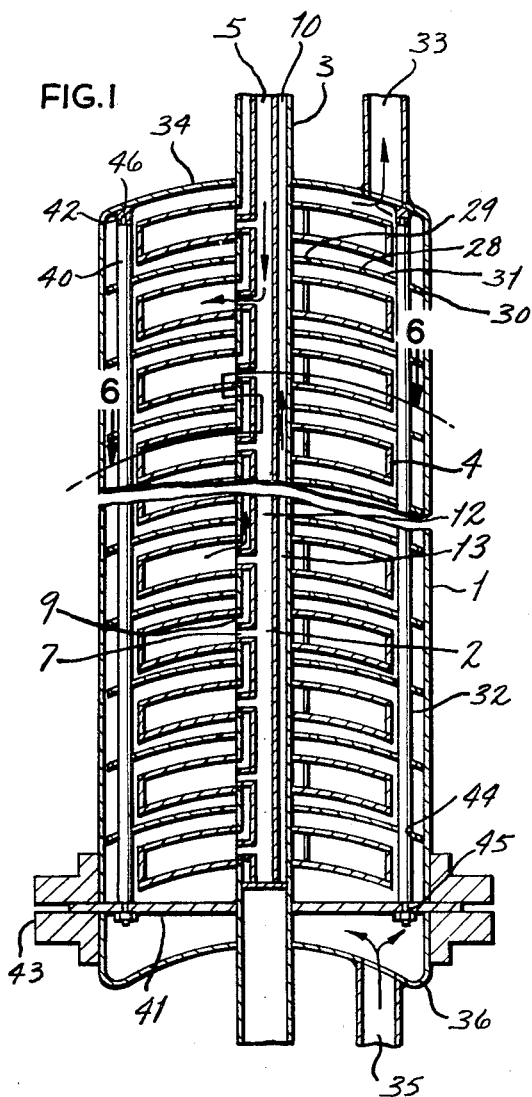
FIG. 1 is a transverse vertical sectional view of an embodiment of a heat exchanger of this invention.
Figure 2:
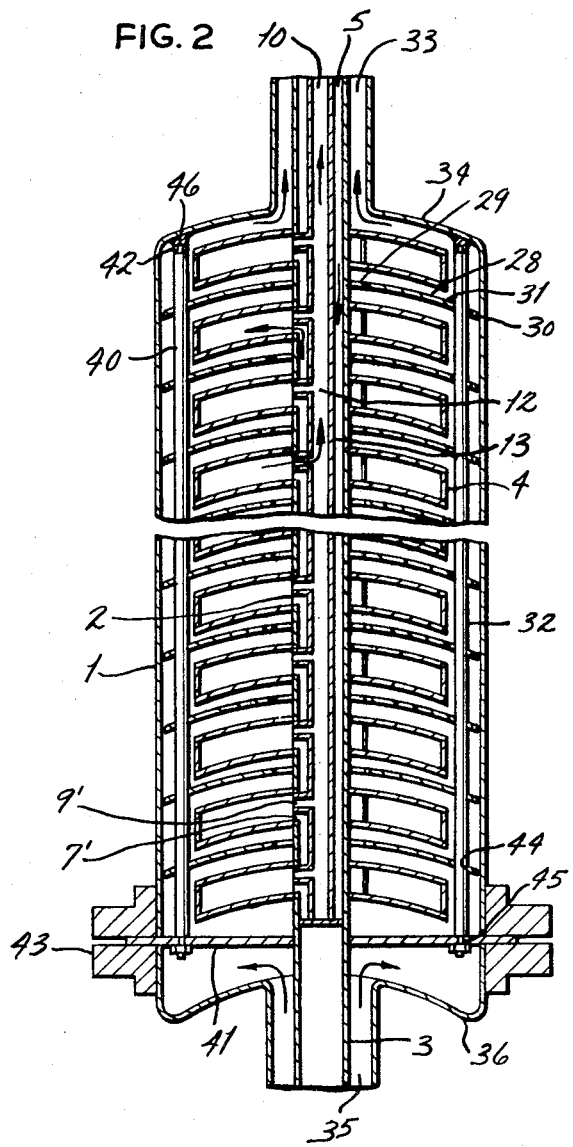
FIG. 2 is a transverse vertical sectional view of another embodiment of a heat exchanger of this invention.

The heat exchanger of this invention is designed to provide a highly efficient transfer of heat from a heat transfer fluid to a product fluid, which fluids are separated from each other by a heat conductive wall. More particularly the heat exchanger provides for efficient exchange of heat between a heat transfer fluid and a high viscosity product fluid under conditions of continuous agitation. The heat exchanger can be used to raise the temperature of the product fluid, lower the temperature of the product fluid, or maintain the temperature of the product fluid within close tolerances while the product fluid is within the shell of the heat exchanger. The uniform close control of temperature of the product fluid within the heat exchanger makes the heat exchanger well-suited for the conduct of chemical reactions of fluids requiring constant agitation and close temperature control by the withdrawal or addition of heat over an extended period of time. The heat exchanger may be utilized at, above, or below normal atmospheric pressure although in most cases the vessel is utilized at above normal atmospheric pressure. Likewise, the heat exchanger may be utilized at, above, or below normal ambient temperatures. Where the temperature of the heat exchanger is substantially above or substantially below normal ambient temperatures it may be desirable to insulate the outer surface of the heat exchanger in order to reduce heat transfer with the atmosphere. In the drawings, FIGS. 1 and 2 illustrate two alternate embodiments of the heat exchanger of this invention. FIG. 1 represents a heat exchanger in which the shell 1 is stationary and the rotor 2 rotates about the vertical axis of the heat exchanger. The shell of the heat exchanger may be of any suitable or desired material, type, construction, dimension or configuration. Generally an arcuate shape symmetrical about the vertical axis is a preferred shape for the shell. In a more preferred embodiment the shell is substantially in the shape of a vertical cylinder as illustrated in the drawings. The shell 1 and the rotor shaft 3 comprise the structural elements of the heat exchanger. Support means (not shown) is connected to at least one of the structural elements of the heat exchanger to hold the heat exchanger in place. Drive means (not shown) is connected to a structural element and imparts to the structural element rotational motion about the vertical axis of the heat exchanger. In the heat exchanger illustrated in FIG. 1 the drive means is connected to the rotor shaft 3 imparting to the rotor rotational motion about the vertical axis of the heat exchanger while the shell 1 remains stationary. In the heat exchanger of FIG. 2 the drive means is connected to the shell 1 imparting to the shell rotational motion about the vertical axis of the heat exchanger while the rotor 2 remains stationary.

The rotor 2 may be of any suitable or desired material and comprises a hollow rotor shaft 3 and hollow disklike members 4 attached to the hollow rotor shaft. The hollow disklike members may be welded to the rotor shaft or attached by any other suitable method which forms a leak-proof seal between the member and the rotor shaft. An inlet 5 in the rotor shaft permits entry of a heat transfer fluid into the hollow shaft. Any suitable heat transfer fluid may be used. Selection of the proper fluid will depend on the desired temperature range in which the heat transfer is to take place, economics, desired level of heat capacity of the fluid and other factors of importance in the given situation. Openings 7 in the rotor shaft 3 communicating with the hollow disklike members 4 allow entry of the heat transfer fluid from the hollow rotor shaft into each hollow disklike member. Openings 9 in the rotor shaft 3 communicating with the hollow disklike members 4 allow re-entry of the heat transfer fluid from the hollow disklike members to the hollow rotor shaft. The heat transfer fluid leaves the rotor shaft 3 through outlet 10.

Figure 3:
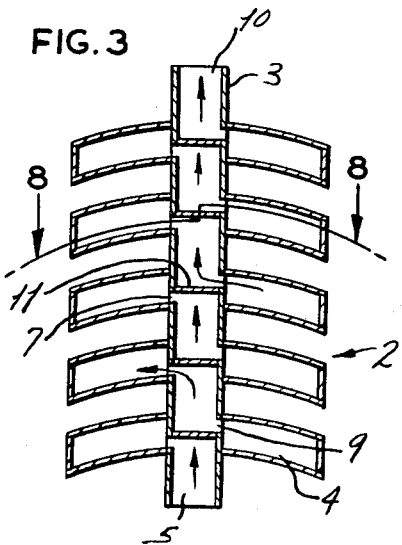
FIG. 3 is a transverse, vertical sectional view of a rotor used in a heat exchanger of this invention.
Figure 4:
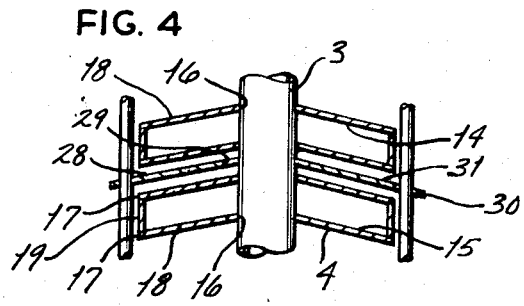
FIG. 4 is a partial transverse vertical sectional view of an embodiment of a heat exchanger of this invention.
Figure 5:
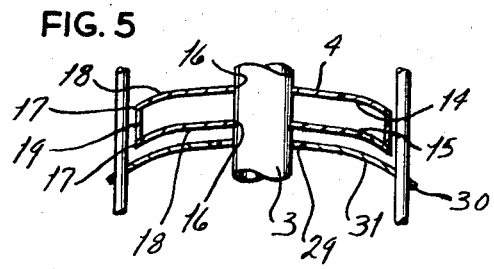
FIG. 5 is a partial transverse vertical sectional view of an embodiment of a heat exchanger of this invention.

The hollow rotor shaft 3 may have, as shown in FIG. 3, a single cavity having a plurality of plugs 11 at spaced intervals within the cavity which plugs stop the flow of fluid within the hollow rotor shaft and redirect the flow of fluid through openings 7 into the attached hollow disklike members 4 attached to the rotor shaft 3 and thence through openings 9 back into the rotor shaft 3 and thence through openings 9 back into the rotor shaft on the downstream side of the plug thus causing the fluid to flow in a tortuous path alternating through a section of the cavity of the hollow rotor and each disklike member attached to the rotor shaft or may have, as shown in FIGS. 1 and 2, a double cavity consisting of a central bore 12 and a concentric annular passage-way 13 which results in a parallel-type flow as contrasted to the series-type flow in the rotor illustrated in FIG. 3 and described above. The central bore 12 may be connected to the inlet 5 and the annular passage-way to the outlet 10 as shown in FIG. 1. When connected in this manner openings 7 in the central bore 12 communicating through the annular passageway 13 between the bore 12 and the hollow disklike members 4 permit the heat transfer fluid to enter each disklike member from the bore and openings 9 in the annular passageway 13 communicating with the hollow disklike members 4 permit the heat transfer fluid to leave each disklike member and proceed to the outlet 10 through the annular passage-way 13. When connected in the manner illustrated in FIG. 2, the annular passage-way 13 is connected to the inlet 5 and the bore 12 to the outlet 10 which causes the heat transfer fluid to enter the hollow disklike members through openings 7' and to leave the hollow disklike members through openings 9'. In certain uses of the device of this invention it may be preferred to use more than one heat transfer fluid and maintain different heat transfer levels in different portions of the rotor and the related hollow disklike members by applying known techniques to the present device. Such alternative methods of operation are within the scope of this invention.

A key innovation in the heat exchanger of this invention is the suprising improvement in strength of the hollow disklike members 4 of this invention as compared to known flat or planar-surfaced hollow disk members having similar dimension components. If not all the increased strength is needed in the present members, the unique design of the present hollow disklike members will result in more efficient transfer of heat between the heat transfer fluid and the product fluid since thinner walls can be utilized in the present disklike members because of their greater strength from improved design. Two factors result in this increased strength, first of all, the shape of the hollow members and, second, the use of a substantially radial flow directing baffle as well as directing fluid flow within the hollow member also stiffens the member. The improved strength and stiffness of the present hollow disklike members are particularly important when the product fluid is a high viscosity liquid.

Referring to FIGS. 4 through 7, the hollow disklike members of the heat exchangers of this invention comprise a top portion 14, a bottom portion 15, both of which portions have a central opening 16, a distal edge 17 and a surface 18 extending from the central opening 16 to the distal edge 17 and a distal edge portion 19 which distal edge portion connects the distal edge 17 of the top portion 14 and the distal edge 17 of the bottom portion 15. The distance between the top portion and the bottom portion are substantially the same when measured from any point on either surface. The plane of the central opening and the plane of the distal edge of both the top portion and bottom portion are substantially parallel but the central opening plane is displaced from the distal edge plane. When the rotor is in place within the shell, the plane of the central opening is above the plane of the distal edge. The surface 18 of the top and bottom portions extending from the central opening to the distal edge may be an arcuate surface (as in FIGS. 1 to 3), a conic section (as in FIG. 4), a combination of a conic section and an arcuate surface (as in FIG. 5) or a section of a sphere (as in FIG. 5) or a section of a sphere (as in FIG. 7). In a preferred embodiment where the surface 18 is a spheriodal section, the radius of curvature of the section of the sphere is from about 0.7 to about 2 times the diameter of the shell. The distal edge portion 19 is preferably in the shape of a section of a cylinder described as the section between 2 planes perpendicular to the axis of the cylinder and separated by the distance between the top portion 14 and the bottom portion 15 of the hollow disklike member 4.

Figure 6:
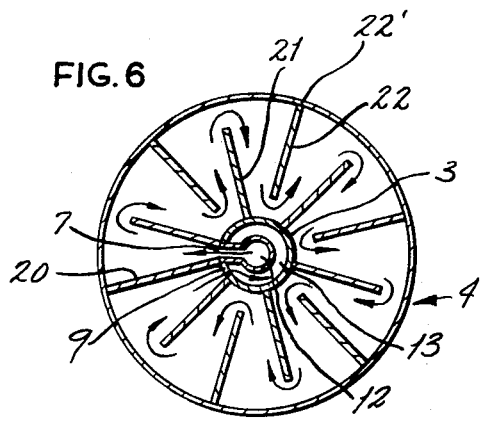
FIG. 6 is a transverse horizontal sectional view at 6—6 of FIG. 1.
Figure 8:
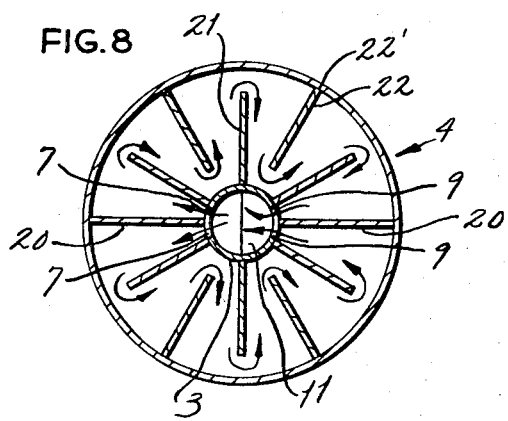
FIG. 8 is a transverse horizontal sectional view at 8—8 of FIG. 3.

Communicating with the hollow disklike members 4 are inlet 7 and outlet 9 openings in the rotor shaft 3. The placement of the openings is not critical so long as the flow of the heat transfer fluid may be directed throughout the interior of the hollow disklike members 4 by a substantially radial flow directing baffle. When the openings 7 and 9 in the rotor shaft are adjacent to each other as shown in FIG. 6, a full baffle 20 separates the openings and extends from the central opening 16 to the distal edge 17 of the top portion 14 and the bottom portion 15 of the hollow disklike members 4 and forms a leak-proof seal with said portions, the distal edge portion 19 and the rotor shaft 3 to direct the flow of the heat transfer fluid in cooperation with central partial baffles 21 and distal partial baffles 22 in a tortuous path from the inlet 7 through the hollow disklike member 4 to the outlet 9 as illustrated by FIG. 6. Where the inlet opening 7 and the outlet opening 9 are substantially diametrically opposite as illustrated in FIG. 3, a baffle arrangement as shown in FIG. 8 may be utilized to direct the flow of the heat transfer fluid. In this embodiment full baffles 20 substantially bisect the inlet 7 and the outlet 9 causing the heat transfer fluid to flow in 2 separate tortuous paths guided by central partial baffles 21 and distal partial baffles 22.

Figure 7:
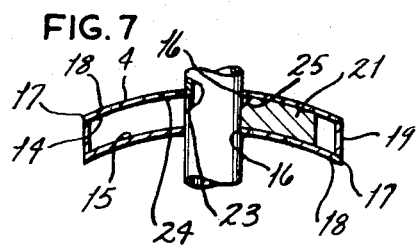
FIG. 7 is a partial transverse vertical sectional view of a rotor used in a heat exchanger of this invention.

When a heat transfer fluid is forced to flow in a tortuous path as in the present invention, venting of air or other gases from the equipment to eliminate any entrapped gas can be a problem. An embodiment of this invention as illustrated in FIGS. 1 to 3 where the outlet 10 for the heat transfer fluid is located at the top of the rotor 2 eliminates the venting problem by making the rotor self-venting. In this embodiment as shown in FIG. 7 the top 23 of each outlet opening 9 in the rotor shaft 3 is aligned with the lower surface 24 of the top portion 14 of the hollow disklike members 4. Additionally each central partial baffle 21 has a notch or opening 25, the perimeter of said notch or opening being described by the rotor shaft 3 lower surface 24 of the top portion 14 of the hollow disklike members 4 and the notched out edge of the central partial baffle 21. These partial baffle notches and the alignment of the outlets with the top portion of the hollow disklike members allow any air or other gas within the rotor to flow freely from the rotor when the rotor is being filled with heat transfer fluid.

Figure 9:
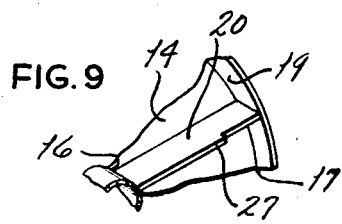
FIG. 9 is a partial isometric view of the distal edge portion, top portion, and a full baffle of a hollow disklike member attached to a rotor shaft.
Figure 9A:
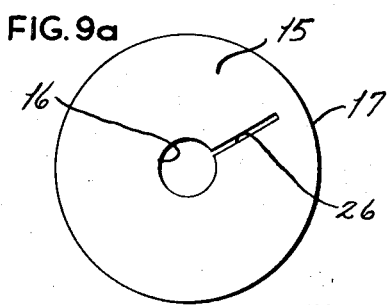
FIG. 9a is a plan view of a slotted bottom portion of hollow disklike member before assembly.
Figure 9A:

In a typical fabrication of the rotor the top portion 14 of the hollow disklike member 4 is welded to the distal edge portion 19, the full baffle is aligned with the central opening 16 and welded to the distal edge portion 19 and the top portion 14, the central partial baffles 21 are notched, aligned with the central opening 16 and welded to the top portion substantially radially in spaced arrangement around the central opening. As shown in FIG. 9a a long narrow opening or slot 26 is provided in the bottom portion 15 which slot is of sufficient width and proceeds substantially radially from the central opening toward the distal edge to a sufficient distance so as to be capable of receiving an extended portion 27 of the full baffle 20 which full baffle has been previously attached to the top portion 14 and the distal edge portion 19. At spaced intervals on the upper surface of the bottom portion 15 oriented radially near the distal edge of the bottom portion 15, the distal partial baffles 22 are affixed. The distal edge 22' of the distal partial baffle 22 is spaced away from the distal edge 17 of the bottom portion 15 by a distance sufficient to accommodate the distal edge portion 19.

The rotor shaft 3 is inserted through the central opening 16 of the top portion 14 of the hollow disklike member 4. After aligning the top 23 of the outlet hole 9 of the rotor shaft 3 with the lower surface 24 of the top portion 14 of the hollow disklike member 4 and properly positioning the full baffle 20 in appropriate spaced relation to the inlet opening 7 and outlet opening 9, the top portion 14 is welded or affixed in any suitable manner to the rotor shaft 3 to form a leak-proof seal. Likewise the full baffle 20 and central partial baffles 19 are affixed to the rotor shaft 3 taking care to maintain open and clear the notch or opening 25 between the central partial baffle 21 the rotor shaft 3 and the top portion 14. Similarly the rotor shaft 3 is inserted through the central opening 16 of the bottom portion 15 of the hollow disklike members 4 and the bottom portion 15 is carefully placed against the distal edge portion 19 so that the partial distal baffles 22 are received within the distal edge portion 19 and the slot 26 receives and accommodates the extended portion 27 of full baffle 20. The extended portion 27 of full baffle 20 is welded to the bottom portion 15 by a slot welding technique. The bottom portion 14 is welded or affixed in any suitable manner to the distal edge portion 19 and to the rotor shaft 3 to form a leak-proof seal.

For maximum strength it may be desirable to weld or affix by other suitable methods all baffles to both the top and bottom portions of the hollow disklike members. Among the known ways which could be used is to use baffles having a cross section shaped like a T or an L, affix all the baffles by their narrow leg to the top portion of the hollow disklike members, prepare slots in the bottom portion in alignment with the baffles affixed to the top portion and weld the base of the L or the inverted T to the bottom portion by known slot welding techniques.

Coating with the rotor shaft 3, hollow disklike members 4 and the shell 1 to form a second tortuous path through which the product fluid flows are disklike partitions 28. The disklike partitions 28 have a central opening 29, a distal edge 30 and a surface 31 extending from the central opening 29 to the distal edge 30. The plane of the central opening is displaced from the plane of the distal edge but, both planes are substantially parallel to each other. When the disklike partitions are installed within the shell 1 the plane of the central opening 29 is above the plane of the distal edge 30 and both planes are substantially perpendicular to the vertical axis of the shell. The surface 31 of the disklike partitions 28 from the central opening 29 to the distal edge 30 may be an arcuate surface (as in FIGS. 1 and 2), a conic section (as in FIG. 4), a combination of a conic section and an arcuate surface (as in FIG. 5) or a section of a sphere (as in FIG. 10). Generally the surfaces 31 of the disklike partitions 28 are substantially similar in shape to the surfaces 18 of the hollow disklike members 4 with which members the partitions are interleaved. In a preferred embodiment where the surface 31 is a spheroidal section the radius of curvature of the section of the sphere is from about 0.7 to about 2 times the diameter of the shell.

The disklike partitions are held in place by support means 32. For best results it is desirable that the disklike partitions when installed within the shell, be positioned at the midpoint of the space between successive hollow disklike members 4 affixed to the rotor shaft 3. Preferably, the distance from the central opening 29 of the disklike partition 28 to the rotor shaft 3 is substantially the same as, or greater than, the distance from the disklike partition 28 to the bottom portion 15 of the hollow disklike member 4 or the distance from the disklike partition 28 to the top portion 14 of the hollow disklike member 4. The distance from the distal edge portion 19 of the hollow disklike member 4 and the shell 1 is, at least, sufficient to accommodate the support means 32 for the disklike partitions 28 and, preferably, substantially equal to or greater than the distance from the disklike partition 28 to the bottom portion 15 of the hollow disklike member 4 or the distance from the disklike partition 28 to the top portion 14 of the hollow disklike member 4.

The diameter of the distal edge 30 of the disklike partitions 28 is of such size that, when the plane of the distal edge 30 is perpendicular to the vertical axis of the shell, the distal edge 30 will fit within the shell 1 and, preferably, when oriented in this same manner, can be held in place by the support means 32 so that, at most, only a very small portion of the product fluid will pass between the distal edge 30 and the shell 1. Thus, when the product fluid enters through the bottom of the shell and leaves through the top of the shell the disklike partitions direct the flow of the product fluid toward the rotor shaft in that portion of the tortuous path between the disklike partition 28 and the top portion 14 of the hollow disklike members 4 and then toward the shell 1 in that portion of the tortuous path between the disklike partition 28 and the bottom portion 15 of the hollow disklike members 4. When the product fluid enters the top of the shell and leaves the bottom of the shell, the product fluid would flow toward the shell 1 when between the disklike partition 28 and the top portion 14 of the hollow disklike member 4 and toward the rotor shaft 3 when between the disklike partition 28 and the bottom portion 15 of the hollow disklike member 4. An opening 33 in the top portion 34 of the shell 1 and an opening 35 in the bottom portion 36 of the shell 1 provide for the product fluid to enter and to exit the heat exchanger. It is preferred to have the product fluid enter the heat exchanger through opening 35 and exit through opening 33.

Figure 11:
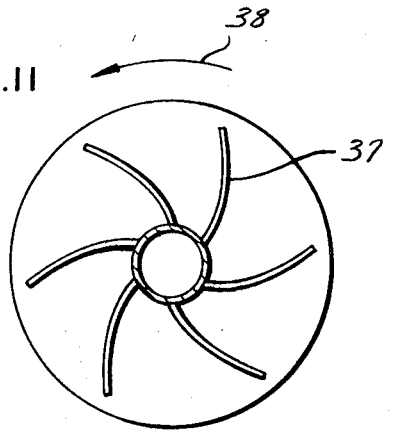
FIG. 11 is a schematic horizontal view of the top surface of a hollow disklike member attached to a rotor shaft.
Figure 12:
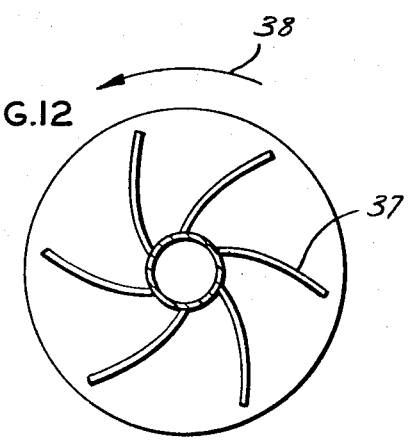
FIG. 12 is a schematic horizontal view of the bottom surface of a hollow disklike member attached to a rotor shaft.

In a preferred embodiment in order to facilitate the movement of the product fluid alternately toward the rotor shaft and away from the rotor shaft arcuate shaped flights may be provided to urge the product fluid in the desired direction. Where slower flow through the heat exchanger and greater mixing of the product fluid is desired the flights may be oriented to urge the product fluid in a direction opposed to the desired direction of flow. Where only greater turbulence is desired the flights may be radial in orientation and thus have a neutral effect on product fluid flow. FIG. 11 shows an arrangement of flights 37 located on the top portion 14 of a hollow disklike member 4 attached to a rotor shaft 3 rotating in the direction of the arrow 38, which flights urge the product fluid toward the rotor shaft 3. FIG. 12 shows an arrangement of flights 37 located on the bottom portion 15 of a hollow disklike member 4 attached to a rotor shaft 3 rotating in the direction of the arrow 38 which flights urge the product fluid away from the rotor shaft 3. Where the shell rotates rather than the rotor such flights may be on the disklike partitions 28 connected by support means 32 to the shell 1 instead of on hollow disklike members 4 connected to the rotor shaft 3.

Figure 10:
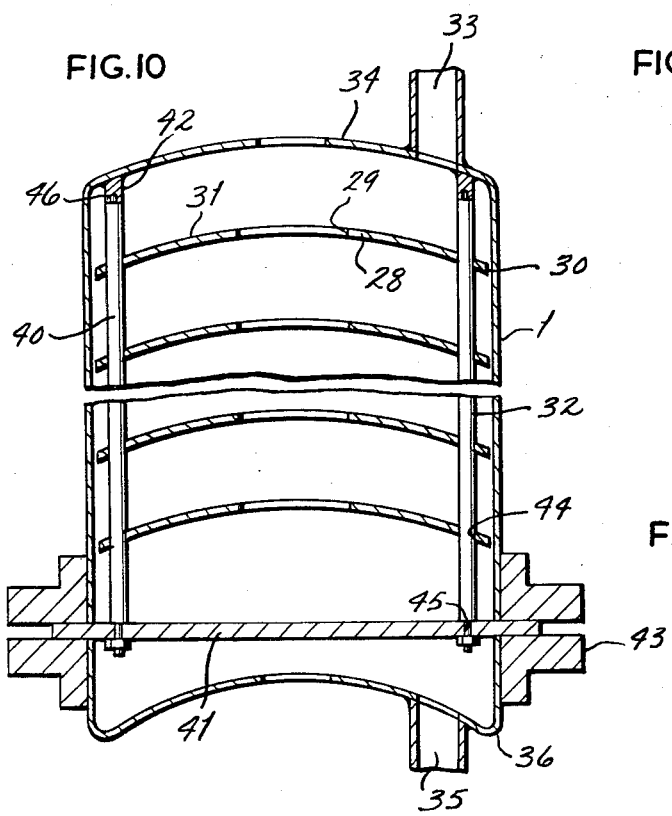
FIG. 10 is a transverse vertical sectional view of a heat exchanger of this invention without the rotor in place.
Figure 13:
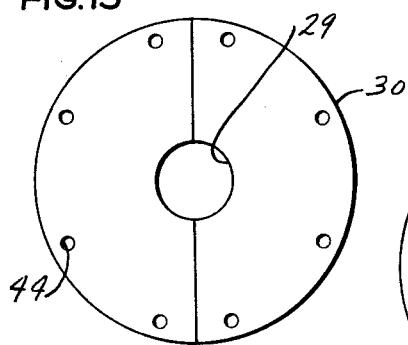
FIG. 13 is a plan view of a disklike partition having two sections of substantially the same size.
Figure 14:
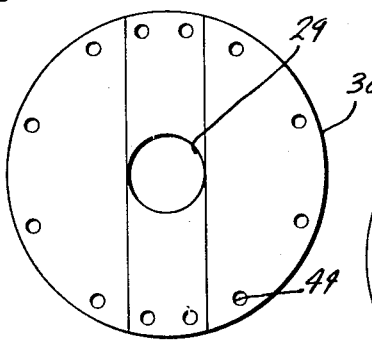
FIG. 14 is a plan view of a disklike partition having a plurality of sector-shaped sections.
Figure 15:
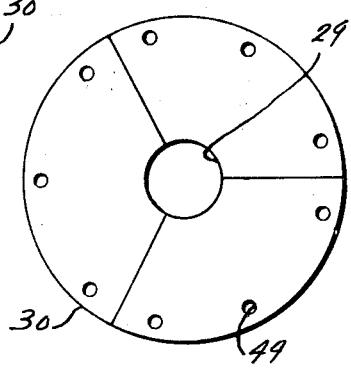
FIGS. 15 and 16 are plan views of disklike partitions having a plurality of various-shaped portions.
Figure 16:
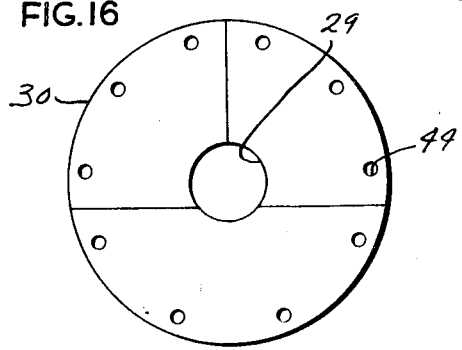

Any suitable support means may be used to hold the disklike partitions in place and connect the partitions to the shell of the heat exchanger. FIGS. 1, 2 and 10 illustrate one of many suitable support means. Reference to FIG. 10 will show the elements of the support means most clearly. The illustrated support means comprises a plurality of rods 40 connected to a flat ring 41 and insertable in receiving sockets 42 connected to the top portion 34 of the shell 1. The bottom portion 36 of the shell 1 is removable from the shell 1 and is connected to the shell 1 by flange means 43. The flange means 43 accommodates the flat ring 41 and holds the flat ring 41 rigidly in place forming a leak-proof seal between the shell 1 and the ring 41 and between the removable bottom portion 36 of the shell 1 and the ring 41. In some embodiments of this invention it may be preferable to have the top portion 34 of the shell 1 be removable and in other embodiments of this invention it may be preferable to have both the top portion 34 and the bottom portion 36 be removable from the shell 1. The plurality of rods 40 are inserted through openings 44 in the disklike partitions 28 near the distal edge 30 of the disklike partitions 28 and the disklike partitions 28 are affixed to the rods 40 by welding or other suitable means at spaced intervals along the rods 40 so that the plane of the distal edge 30 is substantially perpendicular to the rods 40 and the distance between the disklike partitions 28 is sufficient to accommodate the hollow disklike members 4 attached to the rotor shaft 3 and allow flow of the product fluid between the partition 29 and the hollow member 4. The rods 40 are then inserted in openings 45 in the flat ring 41 and fastened to the ring 41 by removable fastening means. The assembled disklike partitions 28 and partition support means 32 are then inserted into the shell 1 with the bottom portion 36 removed. The ends 46 of the rods are inserted into receiving sockets 42 and the flat ring 41 is seated against the shell 1. The bottom portion 36 is then secured in place against the ring 41 by flange means 43 to form a leak-proof seal and to affix the partition support means to the shell. It is to be noted that the above described procedure emplaces the partitions and the partition support means within the shell but does not describe emplacement of the rotor. In order to accommodate the rotor, the partitions and partition support means are assembled around the rotor before insertion of the entire assembly into the shell. To enable the assembly of the partitions around the rotor shaft and between hollow disklike members attached to the rotor shaft, the disklike partitions are in sections. The partitions have at least two sections. The size and number of sections will depend on the clearances between adjacent hollow disklike members, the extent of curvature of such members and the partitions and other considerations. The shape of the sections is not critical so long as when the sections are assembled with and connected to the partition support means within the shell of the heat exchanger, the sections form a strong unitary disklike partition. The sections, after assembly around the rotor shaft, may be permanently fastened together by welding or other suitable means or fastened together by bolts, clamps or other means to facilitate disassembly for maintenance or not fastened together at all, with adjacent edges of sections forming a butt joint or possibly a tongue-and-groove-type joint. A disklike partition may comprise two sections of substantially equal size, as in FIG. 13, a plurality of segments, as in FIG. 14, a plurality of sectors, as in FIG. 15, or a variety of shaped portions, as in FIG. 16.

When the shell 1 of the heat exchanger is stationary, as shown in FIG. 1, placement of openings 35 and 33 is not critical. However, when the shell 1 of the heat exchanger rotates, openings 35 and 33 must be concentric and generally are annular openings about the rotor shaft 3. Packing and sealing of all rotary joints and fittings for the heat exchanger of this invention may be accomplished by techniques known to those skilled in the art and are not a novel part of this invention.

The foregoing description of the invention is explanatory thereof and various changes in the size, shape and materials, as well as in the details of the illustrated construction may be made within the scope of the appended claims, without departing from the spirit of the invention.

I claim:

1. A heat exchanger comprising structural elements comprising a shell having an opening and a removable end portion and a hollow rotor shaft insertable within the shell and, when positioned within said shell, extending beyond the shell through an opening in the shell concentric to the vertical axis of the shell;

support means being connected to, and supporting a structural element;

flow directing elements insertable in said shell and positioned within said shell between the rotor shaft and the shell comprising:

a plurality of hollow disklike members connected to the rotor shaft, a plurality of disklike partitions comprising a plurality of sections, and partition support means which means connects said partitions to said shell and holds said partitions in interleaved spaced relation to said hollow disklike members, said hollow disklike members and said disklike partitions each having a central opening, a distal edge and a surface extending from said central opening to said distal edge, the plane of which central opening being displaced from, but substantially parallel to, the plane of said distal edge and, when in place within the shell, said plane of said central opening being above said plane of said distal edge, both of said planes being substantially perpendicular to said vertical axis of said shell, said hollow disklike members having a top portion, a bottom portion, a distal edge portion connecting said top portion and said bottom portion at the distal edge of a said hollow disklike member, and at least one substantially radial baffle for directing flow of a heat transfer fluid within a said hollow disklike member and coacting with said hollow rotor shaft which hollow rotor shaft has an inlet opening and an outlet opening communicating with said hollow disklike members whereby said hollow rotor shaft, said hollow rotor shaft openings and said hollow disklike members form a tortuous conduit for the passage of a heat transfer fluid, said hollow disklike members and said hollow rotor shaft forming a heat conductive surface and together with said disklike partitions and said shell forming a second tortuous conduit for the passage of a product fluid whereby said product fluid exchanges heat with said heat transfer fluid through the heat conductive surface of said rotor shaft and said hollow disklike members;

and one of said structural elements being adapted to suitable means to impart thereto rotational motion about the vertical axis of the shell so that the product fluid is subjected to agitation while exchanging heat with the heat transfer fluid.

2. The heat exchanger of claim 1 wherein suitable means is adapted for connection to said rotor shaft and imparts thereto rotational motion about the vertical axis of the shell and the support means is connected to and supports the shell.

3. The heat exchanger of claim 1 wherein the shell is a vertical cylinder.

4. The heat exchanger of claim 1 wherein the surface of the disklike hollow members and the disklike partitions extending from the central opening to the distal edge is a conic section.

5. The heat exchanger of claim 1 wherein the surface of the disklike hollow members and the disklike partitions extending from the central opening to the distal edge is a section of a sphere.

* * * * *